Nov. 20, 1934.　　　L. A. FRAYER　　　1,981,594

METHOD OF MAKING NUTS

Original Filed June 7, 1930

INVENTOR:
LEE A. FRAYER

Kwis Hudson & Kent
ATTORNEYS.

Patented Nov. 20, 1934

1,981,594

UNITED STATES PATENT OFFICE 1,981,594

METHOD OF MAKING NUTS

Lee A. Frayer, Kent, Ohio, assignor to Roy H. Smith, Kent, Ohio

Original application June 7, 1930, Serial No. 459,656. Divided and this application December 24, 1931, Serial No. 583,028

9 Claims. (Cl. 10—86)

This invention relates to a new method of making accurate, high quality nut blanks, starting with rough oversize blanks and proceeding through a series of operations to bring about a gradual reduction in the outer dimensions of the blanks and a compacting, smoothing and hardening of the metal thereof, as well as the formation of the blanks with a high degree of precision. My method also involves the step of causing the blank to project from one of the reducing dies and machining it while so held, the die being thus utilized as a work holding chuck of the greatest accuracy. The application is a division of my copending application Serial No. 459,656 filed June 7, 1930.

At the present time, nut blanks of the highest grade are usually machined out of bar stock. This method involves the expenditure of considerable time, and wastes some little material because of the boring of the hole and because of the fact that the cutting tool for cutting off each blank must have width. The greater bulk of nut blanks now manufactured, however, are cold pressed out of strip metal. Here, again, there is a waste of material which, is the case of hexagonal nuts, runs in the neighborhood of 45% of the gross. Nuts manufactured in accordance with my new method are of far better quality than those made from blanks pressed out of strip steel, and are equal, if not superior, in accuracy, strength, hardness and finish to nuts turned out of bar stock. The waste of metal, however, is but 10% of the gross.

Accordingly, one of the objects of my invention is the provision of a method of making nuts which shall practically eliminate material waste and shall result in the formation of a nut of great precision, strength, hardness and fine finish.

Another object is the provision of a new method of making nuts from rough blanks, which involves passing oversized blanks through a series of reducing dies.

A further object is the utilization of a reducing die as a chuck for holding the blank during a machining operation in order that the centering of the machining tool with respect to the work may be accurate to the greatest possible degree.

In the accompanying drawing I have illustrated certain apparatus which may be employed in carrying out the invention, and in addition have shown the condition of the work at various stages of the method.

Figures 4, 5:
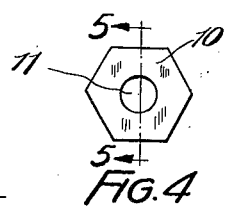
Figs. 4 and 5 are elevational and sectional views respectively of a rough blank such as may be employed in carrying out the invention.
Figures 6, 7, 8:
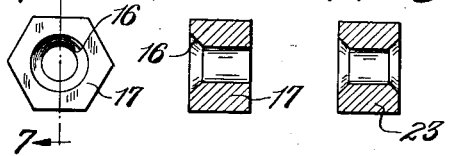
Figs. 6 and 7 are elevational and sectional views respectively of a blank following the first reduction and countersinking steps of the method.
Fig. 8 is a sectional view of the blank following the second reduction and countersinking step of the method.

In accordance with the method of my invention, the work acted upon may consist of rough hot-pressed blanks formed with central openings, the blanks being of the form illustrated in Figs. 4 and 5, although no attempt has been made in the illustration to show the roughness and inaccuracy to which these blanks may be subject. They are made somewhat larger and somewhat thinner than the corresponding dimensions of the finished article. In practice they may run as much as fifty-thousandths of an inch oversize. In the drawing the blank used in the method, before any operation is performed upon it, is marked 10, and its opening is marked 11. This blank is brought into alignment with the opening of a reducing die 12. It is to be understood that the terms "reducing" and "reducing die", as herein employed, shall be construed to exclude "trimming" and "trimming die", respectively, or any dies or operations which effect a cutting of the blank as distinguished from a compressing or extruding of the same. A plunger 13 is then advanced, the pilot 14 on the forward end of the plunger entering the opening 11 of the blank. A conical neck 15 between the pilot 14 and the plunger proper engages the blank and carries it into the die opening. The dimensions of the die opening are such that the blank is drawn down, reduced, or extruded to a material extent, that is so that its transverse dimensions are reduced, say twenty-thousandths of an inch, and its thickness accordingly increased to a slight extent. At the same time the conical neck 15 produces a countersink in the blank, as indicated at 16 in the drawing. The pilot 14, of course, prevents the opening in the blank from being reduced by the inward pressure of the die. The plunger is moved forward to approximately the position illustrated in Fig. 1, and then retracted, leaving the blank still in the die, although a portion of it may be exposed. The blank left in the die by the preceding operation is thus forced out, and may be dropped into a suitable receptacle or otherwise removed or disposed of. In the drawing, the blank as it emerges from the die after this first step of the method is marked 17, and is shown in detail in Figs. 6 and 7.

Figure 1:
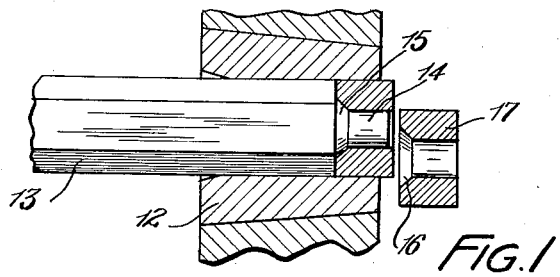
Figs. 1, 2 and 3 are more or less diagrammatic views, showing some of the parts in vertical section, of apparatus which may be employed in carrying out my method.
Figure 2:
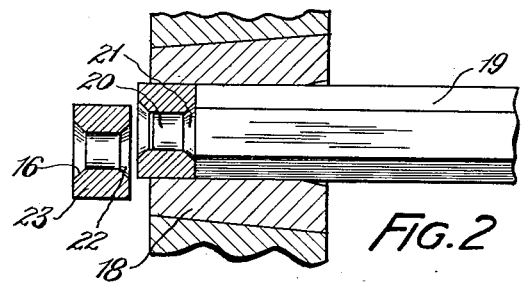

In the second step of the method the partly formed blank 17 is forced into a second reducing die 18 by means of a second plunger 19 having a pilot 20 and a conical neck 21 similar to the corresponding parts in Fig. 1. The blank 17 is caused to enter the die with its countersink 16 forward. The die 18 is smaller than the die 12, so as to bring about a second reduction of the transverse dimensions of the blank by extrusion of metal. This second reduction, for example, may be in the neighborhood of twenty-thousandths of an inch. In the course of this operation the neck 21 of the plunger produces a countersink 22 in the rear face of the blank. The blank resulting from this second step of the method is marked 23 in the drawing.

Figure 3:
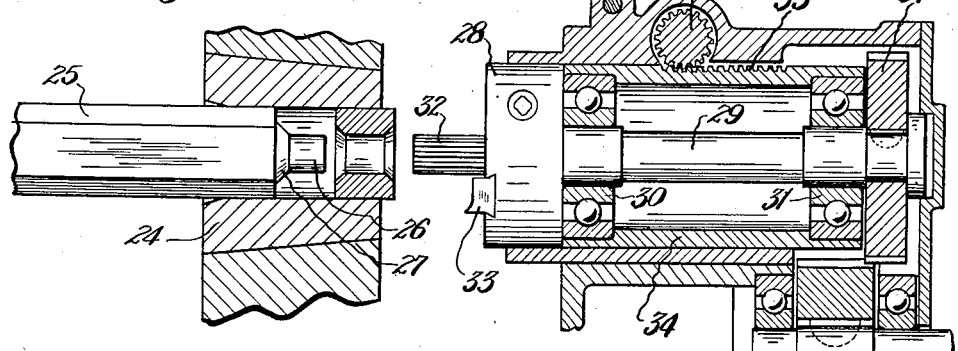

A third reduction step is illustrated in Fig. 3, wherein the die 24 is slightly smaller than the die 18. The difference in size in this case may be somewhat less than before, or in the neighborhood of ten-thousandths of an inch. A third plunger 25, having a pilot 26 and a conical neck 27 is employed. The blank is forced nearly through the die, approximately to the position illustrated in Fig. 3, and then the plunger is retracted, it being illustrated in this figure at a point in its movement of withdrawal.

Figure 9:
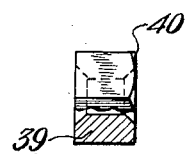
Figs. 9 and 10 are side and elevational views respectively of a blank subsequent to the third reduction step and subsequent to a machining operation performed upon one face of the blank.
Figure 10:
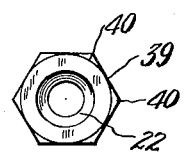

While the blank is thus held in the die 24, preferably with its forward face protruding somewhat beyond the face of the die, I perform upon it some one or more machining operations. In the drawing I have shown a head 28 mounted upon a shaft 29 which is supported in ball bearings 30 and 31, the shaft being arranged in alignment with the axis of the die. It is possible by careful workmanship to make this centering operation accurate to within one-thousandth of an inch. In the head I mount the machining tool or tools, which in the present instance consist of a reamer 32 and a cutter 33, the latter being adapted to face the end of the blank and turn off the outer corners, producing what is known as a crown. Any suitable means may be employed for rotating the shaft 29 and for moving the bearings 30 and 31 backward and forward to and away from operative position. In the case illustrated these bearings are mounted in a sleeve 34 which has a rack 35 on one side thereof that is in mesh with a pinion 36, which may be rotated to move the sleeve forward and backward. On the rear end of the shaft 29, beyond the bearing 31, there is keyed a gear 37 which meshes with a wide faced gear 38 driven by any suitable power means. Hence the shaft 29 rotates continuously and travels back and forth with the sleeve 34. The condition of the blank after it is pushed out of the die 24 by the next blank pushed into the die, is illustrated at 39 in Figs. 9 and 10, and the crown produced upon the blank by the cutter 33 is shown in these figures at 40.

Although I have shown a machining operation being performed upon the blank while held in one only of the three dies 12, 18, 24, it is quite apparent that it is within the purview of the invention to perform other machining operations while the blank is held in one or more of the other dies, and if such an operation were to be performed while the blank was held or chucked in die 18, as well as while held in die 24, it is apparent that both faces of the blank would be machined.

A fin may be extruded from the blank backwardly over one or more surfaces of the plunger, since the latter necessarily fits loosely enough to move readily through the die. The feature of leaving a blank in the die and discharging it by moving a succeeding blank against it has an important advantage in this respect, that the fin so formed is folded down against the rear face of the blank where it can cause no interference with the handling of the blank thereafter in transfer mechanism, blank chutes, or the like.

When a blank has been forced into and partially through a die, it will have gripped the pilot on the end of the plunger very tightly, but owing to the fact that the surface of the blank in engagement with the die is much greater in extent than its surface in engagement with the pilot, the blank is firmly held against retraction when the plunger is withdrawn.

The reducing operations serve not only to bring the blank down to accurate dimensions, but also to compact, harden, strengthen and smooth the metal, producing a nut blank of precision and fine finish which is superior also in strength to blanks made by other methods. The formation of a blank by my process is also economical because of the fact that waste metal is reduced to a minimum.

In the foregoing description I have necessarily gone somewhat into detail in order to explain fully the particular embodiments of the apparatus herein illustrated, but I desire it to be understood that such detail disclosures are not to be construed as amounting to limitations, except as they may be included in the appended claims.

Having thus described my invention, I claim:

1. The method of forming with precision, hardening, strengthening and smoothing a nut blank, which consists in slidingly advancing a rough nut blank through a series of progressively tapering dies and thereby performing a series of successive die forging operations upon the rough blank, and thus reducing its transverse dimensions and increasing its thickness step by step.

2. The method of forming with precision, hardening, strengthening and smoothing a nut blank, which consists in slidingly advancing a rough nut blank through a series of progressively tapering dies and thereby performing a series of successive die forging operation upon the rough blank, and thus reducing its transverse dimensions step by step until the desired transverse dimensions are reached, and reaming the hole in the blank while the same is held by one of the dies.

3. The method of finishing a nut blank, which consists in slidingly advancing a rough nut blank through a series of progressively tapering dies and thereby performing a series of successive die forging operations upon the rough blank while maintaining the hole in the blank central and of a predetermined diameter substantially, and thus reducing the transverse dimensions of the blank step by step, whereby the metal of the blank is compacted, hardened and smoothed, and the blank is brought down to precision dimensions.

4. The method of forming nut blanks, which consists in slidingly advancing a rough nut blank through a series of progressively tapering dies and thereby performing a series of successive die forging operations upon each rough nut blank while maintaining the hole in the blank central and of a predetermined diameter substantially, and thus reducing its transverse dimensions step by step, whereby the metal of the blank is compacted, hardened and smoothed, and the blank is brought down to precision dimensions, and reaming the hole in the blank while the same is held by one of the dies.

5. The method of making nut blanks, which comprises die forging an oversized blank by pushing it part way through a forging die, performing a machining operation upon the blank while so held, and then completing the travel of the blank through the die.

6. The method of making nut blanks, which comprises forging an oversized blank by causing a plunger to force the blank part way through a reducing die, withdrawing the plunger, performing a machining operation upon the blank while so held, and then causing the plunger to force a second blank part way through the die, thereby completing the travel of the first said blank through the die.

7. The method of making nut blanks, which comprises forging an oversized blank by pushing it part way through a reducing die, while maintaining the hole in the blank central and of a predetermined diameter substantially, reaming the hole in the blank while it is so held, and then completing the travel of the blank through the die.

8. The method of making a nut blank, which consists in performing a series of successive forging operations upon a rough oversized blank, by pushing the blank through reducing dies of successively smaller size, interrupting the travel of the blank in one of said dies, performing a machining operation upon the blank while it is so held by the die, and thereafter completing the travel of the blank through the die.

9. The method of making nut blanks, which comprises performing a series of forging operations upon a rough oversized blank by pushing it through dies of successively smaller size, the reduction in the first die being greater than the reduction in the last die, interrupting the travel of the blank in the last die, machining the blank while so held in the last die, and completing the travel of the blank through the last die.

LEE A. FRAYER.